May 29, 1923.

B. P. BRATT

LOADING AND UNLOADING APPARATUS

Filed May 9, 1921

Inventor

B.P.Bratt,

By Watson E. Coleman

Attorney

May 29, 1923.
B. P. BRATT
1,457,054
LOADING AND UNLOADING APPARATUS
Filed May 9, 1921
3 Sheets-Sheet 2
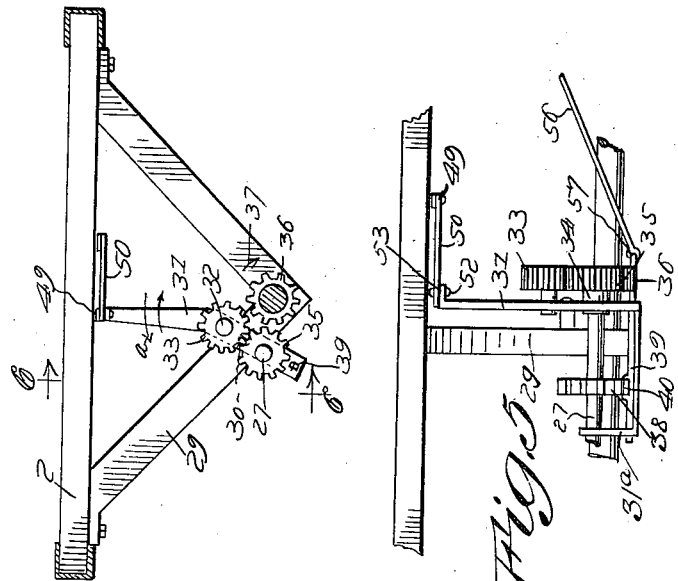
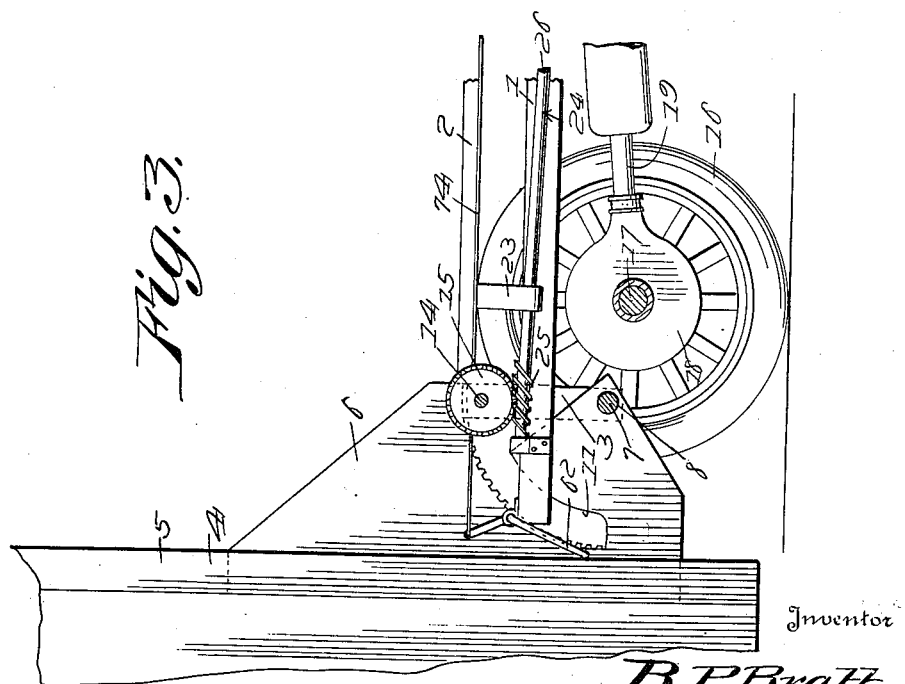
Inventor
B. P. Bratt,
By Watson E. Coleman
Attorney

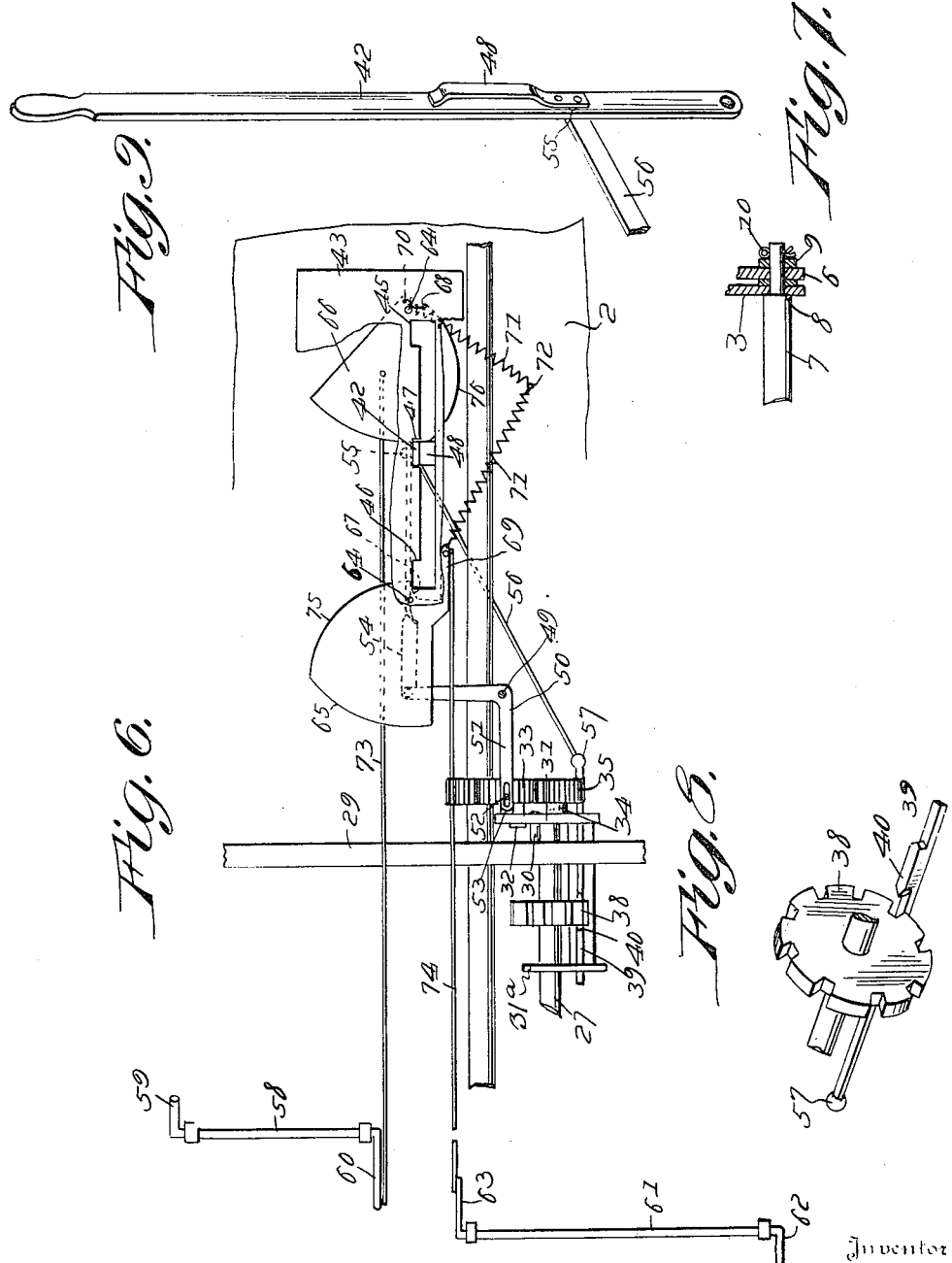

Patented May 29, 1923.

1,457,054

UNITED STATES PATENT OFFICE.

BARNADUS P. BRATT, OF BAKER, OREGON.

LOADING AND UNLOADING APPARATUS.

Application filed May 9, 1921. Serial No. 467,955.

*To all whom it may concern:*

Be it known that I, BARNADUS P. BRATT, a citizen of the United States, residing at Baker, in the county of Baker and State of Oregon, have invented certain new and useful Improvements in Loading and Unloading Apparatus, of which the following is a specification, reference being had to the accompanying drawings.

It is the purpose of the present invention to provide an improved loading and unloading apparatus, wherein the tiltable platform is employed, particularly for use in connection with motor driven trucks, in combination with means operatively connecting the platform and the drive shaft between the motor and the universal joint of the shaft, in order to tilt the platform to a vertical position, or move the platform back to a horizontal position after having been loaded.

Another purpose involves a machine of this character and for the purpose hereinafter indicated, wherein the mechanism operatively connecting the platform and the drive shaft between the motor and the universal joint, is controlled by a single lever, for shifting one or the other of two members in and out of gear with the shaft, whereby the platform may be tilted to a vertical position for dumping or reloading, and then move the platform back to a horizontal position for loading.

Still another purpose is the provision of a safety appliance operated by the platform when it reaches the limit of its vertical position, or the limit of its horizontal position, for returning the single operating lever to its neutral position, thereby avoiding the possibility of gear stripping.

A further purpose consists in the provision of a tiltable platform mounted upon plates, which are fulcrumed upon the rear of the frame of the machine, and which are provided with arcuate gears engaging pinions on a transverse shaft, which is operated by a drive shaft of the engine, so as to tilt the platform either to a vertical or a horizontal position.

While the design and construction at present illustrated and set forth is deemed preferable, it is obvious that as a result of a reduction of the invention to a more practical form for commercial purposes, the invention may be susceptible of changes, and the right to these changes is claimed, provided they are comprehended within the scope of what is claimed.

The invention comprises further features and combination of parts, as will be hereinafter set forth, shown in the drawings and claimed.

In the drawings:

Figure 3 is a sectional view through the rear part of a truck through the platform and the rear axle thereof, showing the worm gear and worm connection with the platform in elevation.

Figure 4 is a sectional view on line 4—4 of Figure 1.

Figure 1:
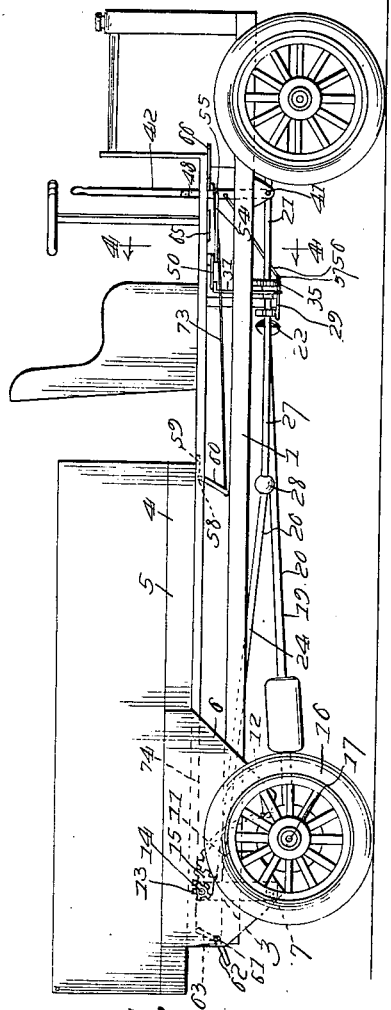
Figure 1 is a view in side elevation of a motor truck showing the improved tiltable platform applied, and a mechanism for operating the platform constructed in accordance with the invention.

Figure 5 is a view in elevation of the gears of the mechanism for shifting the section 27 of the shaft 24 in and out of gear with the gear 36, also showing the lock including the notched wheel 38 and tooth 40.

Figure 6 is an enlarged detail plan view of the forward part of the frame showing the control lever mechanism for operating the tilting mechanism for the platform.

Figure 7, is a detail view of a mounting of the rod or shaft 7.

Figure 8 is a detail view of the slide 39 and the tooth wheel 38, better illustrating the tooth 40.

Figure 9 is an enlarged detail view of the lever 42.

Referring to the drawings, 1 designates the chassis of the motor truck, and 2 denotes a frame, which is super-imposed relatively to the chassis. Arranged at the rear of the chassis and secured to the opposite sides of the frame 2 are vertically disposed plates 3. Adapted to engage and rest upon the frame 2 is a platform 4, which has side bars 5, parts of which rest upon the frame 2 when the platform is moved to a horizontal position. Depending from the side bars are plates 6, which are pivotally mounted on the ends of the rod 7, which connects the lower ends of the plates or standards 3. This rod 7 has shoulders 8, which engage the inner faces of the plates or standards 3, so as to hold the rod or shaft 7 in place. The plates 6 move on the reduced ends of the rod or shaft 7, there being washers 9 and heavy cotter pins 10 carried by the ends of the shaft or rod, to hold the depending plates 6 as journaled in place.

The depending plates 6 have arcuate slots 11, which are constructed concentric with and on radii from the shaft or rod 7, so that the gear teeth 12 on the arcuate edges of the slots 11 may mesh with the teeth of the pinions 13, which are journaled upon the ends of the shaft 14. This shaft 14 is mounted in bearings of the upper parts of the plates or standards 3, and journaled upon and movable with substantially the central portion of the shaft 14 is a worm wheel 15. Obviously when the wheel 15 is rotated, likewise the shaft 14, the platform may be tilted from a horizontal position to a vertical position.

The chassis of the motor truck is mounted upon the usual rear supporting wheels 16, the supporting shaft 17 of which carries the usual differential mechanism 18, and extending therefrom is the usual engine shaft 19. This engine shaft in the present instance, though it may be otherwise constructed, comprises the two sections 20 and 21 connected together by the usual universal joint 22. The section 21 is designed to pass through the usual transmission case (not shown), and to be driven by the usual motor (not shown).

The chassis also carries suitable bearings 23 for the reception and support of a shaft 24. The rear end of the shaft 24 carries a worm 25, which meshes with the worm wheel 15. The shaft 24 also comprises two sections 26 and 27, which are connected together by a universal joint 28. Depending from the forward part of the chassis is a hanger 29, and pivotally mounted thereon as at 30 is a lever 31. This lever 31 carries a stub shaft 32, and mounted to rotate thereon is a gear 33. The forward end of the section 27 of the shaft 24 is mounted in a bearing 34 of the lower end of the lever 31, and the extremity of the section 27 is provided with a gear 35, which is constantly in mesh with the gear or pinion 33. The section 21 of the motor shaft is mounted in a bearing of the depending hanger and carries a gear or pinion 36. The arrangement and construction of the section 21 and the lever 31 and the gears 33 and 35 are such, as to permit either one of the gears 33 and 35 to be moved into mesh with the gear 36, by tilting the lever 31. Since the motor shaft section 21 rotates in a clockwise direction as indicated by the arrow 37, therefore when the lever 31 is moved in the direction of the arrow $a$, the gear or pinion 35 will mesh with the gear or pinion 36, hence rotate the section 27 of the shaft 24 in a counter-clockwise direction, thereby imparting movement to the shaft 14 through the medium of the worm and the worm wheel, hence tilting the platform from a horizontal position to a vertical position. Obviously by a reverse movement of the lever 31, the pinion or gear 35 will be shifted out of mesh with the pinion or gear 36, and the gear or pinion 33 in mesh with the gear or pinion 36, and since the two gears or pinions 33 and 35 are constantly in mesh, the motor shaft section 21 still moving in a clockwise direction, will cause the shaft 24 to rotate in a clockwise direction, thereby tilt the platform from a vertical position back to a horizontal position. When the gear 35 is meshing with the gear 36, the gear 33 is operating idly, but when the gear 33 is in mesh with the gear 36, it acts as means to transmit motion from 36 to 35.

A tooth wheel 38 is mounted to rotate with the section 27 of the shaft 34, and mounted in suitable bearings of the lever 31 and in a bearing of an arm 31ª (which is hung on shaft section 27) of the lever 31 is a slide 39, which is provided with a tooth 40, which engages between any two adjacent teeth of the wheel 38, when both of the gears 33 and 35 are out of mesh with 36, thereby preventing rotation of the shaft 24, and hence holding the tiltable platform either in a horizontal or a vertical position, or in intermediate position. When this slide or tongue 39 is moved in either direction to the extreme limit of its movement, the tooth 40 is disengaged from between any two teeth of the wheel 38, which will permit the shaft 24 to rotate.

Pivotally mounted as at 41 on the forward part of the motor truck is a control lever 42, by which the tiltable platform may be controlled. The flooring of the motor truck immediately in front of the seat has a plate 43 secured thereto, and which is provided with the forwardly extending slot 44. The forward and rear ends of the slot on one side thereof are provided with notches 45 and 46. The same side of the slot intermediate the notches 45 and 46 is provided with a notch 47. The lever 42 operates in the slot, and one side of the lever has riveted thereto a leaf spring 48, which bears against the opposite edge of the slot 44, for holding the lever 42 in any one of the notches in which it may be placed. Pivotally mounted upon the under face of the floor of the motor truck as at 49 is a bell crank lever 50, which has one arm 51 pivotally connected at 52 to a right angle extension 53 of the lever 31. The other arm of the bell crank lever 50 is pivotally connected to a link 54, which in turn is pivoted at 55 to the control lever 42. Obviously when the lever 42 is moved from the neutral notch 47 rearwardly and into engagement with the notch 46, the bell crank lever 50 may be tilted, imparting movement to the lever 31. This movement causes the gear 35 to mesh with the gear 36, resulting in a tilting movement of the platform from a horizontal position to a vertical position. When the control lever 42 is moved from the neutral notch 47 to the forward notch 45, the bell crank lever 50 may be tilted, imparting movement to the lever 31, shifting the gear 33 in mesh with the gear 36, resulting in a tilting movement of the platform from a vertical position to a horizontal position. Each time the control lever 42 is moved from the end notches 45 and 46 to its neutral notch, both of the gears 33 and 35 are moved out of mesh with the gear 36. A rod 56 is pivotally connected to the lever 42 as shown, and is in turn connected at 57 to the slide or tongue 39. Obviously when the lever 42 is moved in engagement with either one of the notches 45 and 46, the tooth 40 on the slide or tongue 39 is free of engagement with the teeth of the wheel 38, so as to permit the shaft 24 to rotate.

Mounted in bearings of the super-imposed frame 2, is a trip shaft 58 provided with a trip arm 59 and a depending arm 60. Rockable in bearings of the rear part of the superimposed frame 2 is a second trip shaft 61 having a trip arm 62 at one end, and at its other end a second arm 63. Fulcrumed under the plate 43 as at 64 are segment plates 65 and 66 provided with abutment shoulders 67 and 68, which are disposed normally adjacent the notches 46 and 45. An arm 69 is carried by the plate 65 and a pin 70 is carried by the plate 66, and connected to this arm and pin 69 and 70 respectively are tensioning coiled springs 71, which are secured at a common point 72 of the frame 2, thereby holding the plates in such positions that the abutment shoulders 67 and 68 will assume normal positions adjacent the notches 46 and 45. A rope or cable 73 is connected to the arm 60 of the trip shaft 58 and in turn to the plate 66. A second cable or rope 74 is connected to the arm 63 and in turn to the arm 69.

Obviously when the lever 42 is moved rearwardly in engagement with the notch 46, having tilted the platform from a horizontal position to a vertical position, the platform will contact with the trip arm 62, rock the trip shaft 61, pull upon the rope or cable 74, which in turn will tilt the plate 65 and cause its shoulder 67 to move the lever 42 laterally, out of engagement with the notch 46, and through the medium of the cam edge 75 of the plate 65, the lever 42 will be moved from the rear end of the slot 44 to the central portion of the slot, and into engagement with the neutral notch 47. This operation of the plate 65 occurs as the platform is approaching a vertical position, and the arrangement and construction of the mechanism for carrying out this operation are such that the lever 42 will reach its neutral position into engagement with the notch 47 a little before the platform completes its movement to a vertical position. In fact the weight of the platform will complete the movement. By this arrangement a safety appliance is provided, to prevent stripping of the gears 33, 35 and 36.

In order to return the platform to a horizontal position, the lever 42 is moved from neutral into engagement with the notch 45 at the forward end of the slot 44. This movement of the lever 42 will move the gear 33 in mesh with the gear 36, causing the shaft 24 to rotate in a clockwise direction. As the platform approaches the limit of its horizontal position, the platform will contact with the trip arm 59, rock the trip shaft 58, thereby pull upon the cable or rope 73, and cause the abutment shoulder 68 to move the lever 42 out of engagement with the notch 45, hence through the medium of the arcuate edge 76 camming against the lever 42, the lever 42 may be moved back to its neutral position. This will occur a little before the platform completes its movement to a horizontal position. In fact as when the platform is moved to a vertical position, its weight will complete its movement to a horizontal position. As previously stated this safety mechanism avoids the stripping of the gears 33, 35 and 36.

Figure 2:
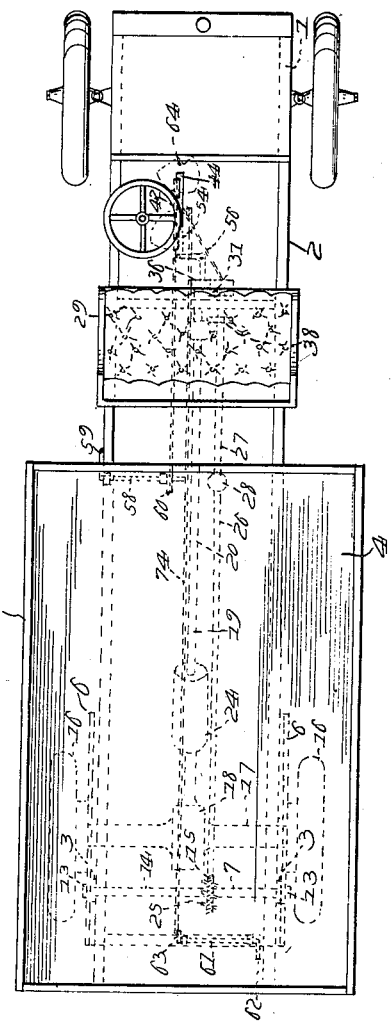
Figure 2 is a top plan view of the motor truck showing the platform in a horizontal position and showing the mechanism for operatively connecting the platform with the drive shaft of the motor and also showing the single lever for shifting the parts of the mechanism.

From a careful inspection of Figures 1, 2 and 6 it will be noted that when the platform is in a horizontal position the trip arm 59 is depressed, and the segment plate 66 is in the path of the lever 42, preventing the lever from moving forwardly, thereby avoiding making a mistake by moving the lever forward, which would result in stripping the gears. Also it will be noted that when the platform is in a vertical tilted position, the trip arm 62 will be held tilted, holding the segment plate 65 in the path of the lever 42, preventing the lever 42 from being moved rearwardly by mistake, instead of forwardly, which forward movement would necessarily restore the platform to its original horizontal position.

The present invention is particularly an improvement on the loading and unloading apparatus set forth, illustrated and claimed in the patent issued to Barney P. Bratt on February 10, 1920, Patent No. 1,330,163. While the above patent discloses a loading and unloading apparatus particularly adapted for use in connection with loading and unloading of pianos, it is obvious that such machine may be used as a loading truck, such as shown in the present drawings. It is also obvious that the present form of construction of loading and unloading apparatus for motor trucks may be used for loading pianos and the like, by simply removing the form of body shown, and employing the form of platform illustrated in the aforesaid patent. The present invention is not to be restricted in its use, for it is obvious that any kind of body or platform may be tiltably supported on the truck.

The invention having been set forth, what is claimed as being useful is:

1. The combination with a motor driven truck, of a platform fulcrumed thereon for tilting movement from a horizontal position to a vertical position, arcuate racks mounted on the platform and whose radii extend from the fulcrum of the platform, means operatively connecting with the racks for moving the platform on its fulcrum and including a pair of members alternately operatively connecting with the motor shaft of the truck, for moving the platform from a horizontal position to a vertical position and vice versa.

2. The combination with a motor driven truck, of a platform fulcrumed thereon for tilting movement from a horizontal position to a vertical position, arcuate racks mounted on the platform and whose radii extend from the fulcrum of the platform, means operatively connecting with the racks for moving the platform on its fulcrum and including a pair of members alternately operatively connecting with the motor shaft of the truck, for moving the platform from a horizontal position to a vertical position and vice versa, and means for shifting said members in and out of operative connection with said motor shaft, enabling the platform to move from a horizontal position to a vertical position and back again.

3. The combination with a motor truck including a motor shaft provided with a gear, of a platform fulcrumed upon the truck and provided with arcuate racks whose radii extend from the fulcrum, an auxiliary shaft operatively geared with said racks and including a section movable laterally toward and from the motor shaft, a pair of members operatively connecting with the movable section of the auxiliary shaft and being shiftable in and out of gear with the gear of the motor shaft, whereby the platform may tilt from a horizontal position to a vertical position and vice versa.

4. The combination with a motor truck including a motor shaft provided with a gear, of a platform fulcrumed upon the truck and provided with arcuate racks, whose radii extend from the fulcrum, an auxiliary shaft operatively geared with said racks and including a section movable laterally toward and from the motor shaft, a pair of members operatively connecting with the movable section of the auxiliary shaft and being shiftable in and out of gear with the gear of the motor shaft, whereby the platform may tilt from a horizontal position to a vertical position and vice versa, and means operatively connecting with said pair of gears for shifting them in and out of gear with the gear on the motor shaft.

5. The combination with a motor truck including a motor shaft provided with a gear, of a platform fulcrumed upon the truck and provided with arcuate racks whose radii extend from the fulcrum, an auxiliary shaft operatively geared with said racks and including a section movable laterally toward and from the motor shaft, a pair of members operatively connecting with the movable section of the auxiliary shaft and being shiftable in and out of gear with the gear of the motor shaft, whereby the platform may tilt from a horizontal position to a vertical position and vice versa, and means operatively connecting with said pair of gears for shifting them in and out of gear with the gear on the motor shaft, said last mentioned means including a lever, means for holding the lever in neutral position, whereby both of the gears of said pair are out of gear with the motor shaft, and means for holding the lever in a position forwardly or rearwardly of the neutral position to hold one or the other of said pair of gears in mesh with the gear of the motor shaft, and means actuated by the platform substantially at the limit of its movement in either direction, and operatively connecting with the lever for moving it either from its forward or rear position to neutral position.

6. The combination with a motor truck including a motor shaft provided with a gear, of a platform fulcrumed upon the truck and provided with arcuate racks whose radii extend from the fulcrum, an auxiliary shaft operatively geared with said racks and including a section movable laterally toward and from the motor shaft, a pair of members operatively connecting with the movable section of the auxiliary shaft and being shiftable in and out of gear with the gear of the motor shaft, whereby the platform may tilt from a horizontal position to a vertical position and vice versa, and means operatively connecting with said pair of gears for shifting them in and out of gear with the gear on the motor shaft, means for holding the lever in a neutral position with both of the gears of said pair out of mesh with the gear of the motor shaft, and means actuated by the lever for locking the auxiliary shaft when the lever is in such neutral position.

7. The combination with a motor truck including a motor shaft provided with a gear, of a platform fulcrumed upon the truck and provided with arcuate racks whose radii extend from the fulcrum, an auxiliary shaft operatively geared with said racks and including a section movable laterally toward and from the motor shaft, a pair of members operatively connecting with the movable section of the auxiliary shaft and being shiftable in and out of gear with the gear of the motor shaft, whereby the platform may tilt from a horizontal position to a vertical position and vice versa, and means operatively connecting with said pair of gears for shifting them in and out of gear with the gear on the motor shaft, means for holding the lever in a neutral position whereby both of the gears of said pair may be held out of gear with the motor shaft, and means actuated by the platform substantially at the limit of its movement and operatively connecting with the lever to shift either of the pair of gears out of mesh with the motor shaft.

8. The combination with a motor truck including a motor shaft provided with a gear, of a platform fulcrumed on the truck to move from a horizontal position to a vertical position, means operatively connecting with the platform and including a pair of shiftable gears to be moved in and out of gear with the gear on the motor shaft, for moving the platform from a horizontal position to a vertical position and vice versa, and a lever for shifting said gears into mesh with the gear of the motor shaft, and means actuated by the platform at the limit of its movement to either position and operatively connecting with the lever and operating the same for shifting said gears out of mesh with the motor shaft gear.

9. The combination with a motor truck including a motor shaft provided with a gear, of a platform fulcrumed on the truck to move from a horizontal position to a vertical position, means operatively connecting with the platform and including a pair of shiftable gears to be moved in and out of gear with the gear on the motor shaft, for moving the platform from a horizontal position to a vertical position and vice versa, and a lever for shifting said gears into mesh with the gear of the motor shaft, means for holding the lever in a neutral position, means forwardly and rearwardly of the neutral position for holding the lever while one or the other of said pair of gears is in mesh with the motor shaft gear, and means actuated by the platform at the limit of its movement to a horizontal or vertical position and operatively connecting with the lever for shifting it back to neutral position, thereby preventing stripping of the gears.

10. In a loading and unloading apparatus, a power imparting mechanism, a tiltably movable member, means operatively connecting therewith including a pair of gears shiftable into and out of gear with said mechanism for moving the member from a horizontal position to a vertical position, means for shifting said gears in and out of mesh with the mechanism, and means actuated by the movable member at the limit of its movement to horizontal or vertical position, and operatively connecting with the gear shifting means to move it, to shift one or the other of said pair of gears out of mesh with the mechanism.

11. In a loading and unloading apparatus, a motor truck having supporting drive wheels, a platform fulcrumed on the truck from said wheels for tilting movement from a horizontal position to a vertical position and vice versa, supporting plates on the platform and having arcuate slots concentric with the fulcrum, said slots having rack teeth on certain of their edges, a transverse shaft mounted in bearings of the motor truck and having gears engaging said rack teeth, a worm wheel on said transverse shaft, a drive shaft having a worm engaging the worm wheel for imparting movement to the transverse shaft, whereby the platform may be tilted.

12. In a loading and unloading apparatus, a motor truck having supporting drive wheels, a platform fulcrumed on the truck from said wheels for tilting movement from a horizontal position to a vertical position and vice versa, supporting plates on the platform and having arcuate slots concentric with the fulcrum, said slots having rack teeth on certain of their edges, a transverse shaft mounted in bearings of the motor truck and having gears engaging said rack teeth, a worm wheel on said transverse shaft, a drive shaft having a worm engaging the worm wheel for imparting movement to the transverse shaft, whereby the platform may be tilted, a power imparting mechanism, a pair of shiftable gears operatively connecting with said driven shaft, one or the other thereof adapted to be moved in and out of gear, with the power imparting mechanism and means for shifting said gears in and out of mesh with the mechanism.

13. In a loading and unloading apparatus, a motor truck having supporting drive wheels, a platform fulcrumed on the truck from said wheels for tilting movement from a horizontal position to a vertical position and vice versa, supporting plates on the platform and having arcuate slots concentric with the fulcrum, said slots having rack teeth on certain of their edges, a transverse shaft mounted in bearings of the motor truck and having gears engaging said rack teeth, a worm wheel on said transverse shaft, a drive shaft having a worm engaging the worm wheel for imparting movement to the transverse shaft, whereby the platform may be tilted, a power imparting mechanism, a pair of shiftable gears operatively connecting with said driven shaft, one or the other thereof adapted to be moved in and out of gear with the power imparting mechanism, and means for shifting said gears in and out of mesh with the mechanism, and means actuated by the platform at the limit of its movement to a horizontal or vertical position for moving said gear shifting means, to move one or the other of said shifting gears out of mesh with the mechanism.

In testimony whereof I hereunto affix my signature.

BARNADUS P. BRATT.